US012799786B2

(12) United States Patent
Cumbo et al.

(10) Patent No.: US 12,799,786 B2
(45) Date of Patent: Nov. 17, 2026

(54) HINGE SYSTEM FOR POWER DOOR WITH X-MOVEMENT

(71) Applicant: MAGNA CLOSURES INC., Newmarket (CA)

(72) Inventors: Francesco Cumbo, Newmarket (CA); Luca Farnesi, Newmarket (CA); Dunia Sardelli, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 8 days.

(21) Appl. No.: 18/745,775

(22) Filed: Jun. 17, 2024

(65) Prior Publication Data

US 2024/0426152 A1 Dec. 26, 2024

Related U.S. Application Data

(60) Provisional application No. 63/548,386, filed on Nov. 13, 2023, provisional application No. 63/540,803, filed on Sep. 27, 2023, provisional application No. 63/522,121, filed on Jun. 20, 2023.

(51) Int. Cl.
*E05D 3/12* (2006.01)

(52) U.S. Cl.
CPC .......... *E05D 3/127* (2013.01); *E05Y 2900/50* (2013.01)

(58) Field of Classification Search
CPC ......... E05D 3/127; E05D 3/147; E05D 15/56; E05Y 2900/50; E05Y 2900/531; B60J 5/047; B60J 5/0477; E05F 15/63
See application file for complete search history.

(56) References Cited

U.S. PATENT DOCUMENTS 3,074,755 A * 1/1963 Peras ........................ B60J 5/047 49/248
3,758,990 A * 9/1973 Balanos ................... B60J 5/047 49/248
6,183,039 B1 * 2/2001 Kohut ................ E05D 15/1081 296/146.12
6,974,177 B2 12/2005 Castillo
7,178,853 B2 2/2007 Oxlet et al.
7,488,029 B2 2/2009 Lechkun et al.
(Continued)

FOREIGN PATENT DOCUMENTS

DE 19943280 C1 1/2001
DE 202004019734 U1 4/2006
(Continued)

*Primary Examiner* — William L Miller
(74) *Attorney, Agent, or Firm* — Dickinson Wright PLLC

(57) ABSTRACT

A hinge system for moving a closure panel relative to a vehicle body of a motor vehicle between open and closed positions includes a closure panel bracket configured for attachment to the closure panel; a mount bracket configured for attachment to the vehicle body, and a hinge member pivotably coupled to the closure panel bracket about a first axis of rotation and to the mount bracket about a second axis of rotation. The hinge member is configured to pivot about both the first axis of rotation and the second axis of rotation over a first range of motion between the open and closed position, and is configured to pivot about one of the first axis of rotation and the second axis of rotation over a second range of motion between the open and closed position.

18 Claims, 16 Drawing Sheets

(56) References Cited

U.S. PATENT DOCUMENTS

| | | | | |
|---|---|---|---|---|
| 7,931,327 | B2 * | 4/2011 | Ertl | B60J 5/105 296/146.12 |
| 8,414,058 | B2 | 4/2013 | Duffy | |
| 10,337,227 | B2 | 7/2019 | Stoof et al. | |
| 10,363,799 | B2 | 7/2019 | Ma | |
| 10,787,845 | B2 | 9/2020 | Trentin et al. | |
| 12,196,023 | B2 * | 1/2025 | Yun | B60J 5/0479 |
| 12,552,232 | B2 * | 2/2026 | Shimizu | B60J 5/047 |
| 2003/0097731 | A1 | 5/2003 | Nania | |
| 2005/0116496 | A1 * | 6/2005 | Lowson | E05F 15/63 296/146.11 |
| 2005/0127712 | A1 | 6/2005 | Castillo | |
| 2008/0222844 | A1 | 9/2008 | Broadhead et al. | |
| 2009/0072582 | A1 * | 3/2009 | Elliott | E05D 3/127 296/146.9 |
| 2012/0049579 | A1 * | 3/2012 | Konchan | E05F 1/1215 16/382 |
| 2021/0170840 | A1 * | 6/2021 | Whitton | B60J 5/047 |
| 2022/0136301 | A1 | 5/2022 | Wood et al. | |
| 2022/0297514 | A1 * | 9/2022 | Yamaguchi | B60J 5/047 |
| 2022/0389743 | A1 | 12/2022 | Klein et al. | |
| 2022/0389744 | A1 * | 12/2022 | Lee | E05D 3/127 |
| 2023/0151673 | A1 | 5/2023 | Dusini | |
| 2023/0332456 | A1 | 10/2023 | Leonard et al. | |
| 2024/0401392 | A1 * | 12/2024 | Araki | E05D 15/28 |
| 2025/0283364 | A1 * | 9/2025 | Wallander | E05D 15/32 |

FOREIGN PATENT DOCUMENTS

| | | | |
|---|---|---|---|
| DE | 102011110904 | U1 | 3/2012 |
| DE | 202017106617 | U1 | 11/2017 |
| DE | 102012212488 | B4 | 12/2019 |
| DE | 102018118125 | A1 | 1/2020 |
| WO | 2019007178 | A1 | 1/2019 |
| WO | 2020049138 | A1 | 3/2020 |

* cited by examiner

HINGE SYSTEM FOR POWER DOOR WITH X-MOVEMENT

CROSS-REFERENCE TO RELATED APPLICATIONS

This application claims the benefit of U.S. Provisional Application Ser. No. 63/548,386, filed Nov. 13, 2023, the benefit of U.S. Provisional Application Ser. No. 63/540,803, filed Sep. 27, 2023, and the benefit of U.S. Provisional Application Ser. No. 63/522,121, filed Jun. 20, 2023, which are all incorporated herein by reference in their entirety.

FIELD

The present disclosure relates to motor vehicles closure members, and more particularly to hinge systems therefor.

BACKGROUND

Motor vehicle commonly have swing doors that pivot about a single axis to move between closed and open positions. As such, during movement of the "swing door," the swing door moves in both X-direction (cross-vehicle vehicle direction) and Y-direction (lengthwise direction) along a constant radius circular path about a common pivot axis defined by one or more aligned hinges. Although such pivoting movement about a single pivot axis over the entire movement of a swing door is effective for movement of the swing door between closed and open positions, improvements are sought to eliminate "seal popping" noise associated with such movement.

SUMMARY

This section provides a general summary of the disclosure, and is not a comprehensive disclosure of its full scope or all of its features.

It is an aspect of the present disclosure to provide a hinge system for a closure member of a motor vehicle that embodies the inventive concepts set forth in the following illustrations.

It is a further aspect of the present disclosure to provide a method of constructing and assembling a closure member and hinge system therefor of a motor vehicle that embodies the inventive concepts set forth in the following illustrations.

In accordance with these and other aspects of the disclosure, a hinge system for moving a closure panel relative to a vehicle body of a motor vehicle between an open position and a closed position is provided. The hinge system includes a closure panel bracket configured for attachment to the closure panel and a mount bracket configured for attachment to the vehicle body. A hinge member operably coupled to the closure panel bracket for movement about a first axis of rotation and operably coupled to the mount bracket for movement about a second axis of rotation. The hinge member is configured to allow the closure panel to move away from the closed position during a primary stage of movement having a first direction motion, and is configured thereafter to move during a secondary stage of movement having a second direction motion different than the first direction motion.

In accordance with a further aspect of the disclosure, a hinge system for moving a closure member relative to a vehicle body of a motor vehicle between open and closed positions includes a power actuator having a drive member moveable to an extended position and a retracted position.

The hinge system includes further includes a closure member bracket configured for attachment to the closure member and a mount bracket configured for attachment to the vehicle body. A hinge member is pivotably coupled to the closure member bracket and to the mount bracket. The hinge member is coupled to the drive member, and a link is pivotably coupled to the hinge member. The link is coupled for movement relative to the mount bracket and for movement relative to the closure member bracket. The hinge member is moveable from a first position, corresponding to the closed position of the closure member, to a second position, corresponding to the open position of the closure member. During a primary stage of movement of the hinge member from the first position toward the second position, the hinge member pivots relative to the closure member bracket, whereat the closure member is caused to move from the closed position along a first path. During a secondary stage of movement of the hinge member toward the second position, immediately following the primary stage of movement, the hinge member and the closure member bracket move conjointly with one another, causing the closure member to move along a second path to the open position, wherein the first and second paths are geometrically different.

In accordance with further aspects of the disclosure, a hinge system for moving a closure panel relative to a vehicle body of a motor vehicle between open and closed positions includes a closure panel bracket configured for attachment to the closure panel. A mount bracket is configured for attachment to the vehicle body, and a hinge member is pivotably coupled to the closure panel bracket about a first axis of rotation and to the mount bracket about a second axis of rotation. The hinge member is configured to pivot about both the first axis of rotation and the second axis of rotation over a first range of motion between the open and closed position, and is configured to pivot about one of the first axis of rotation and the second axis of rotation over a second range of motion between the open and closed position.

In accordance with further aspects of the disclosure, a hinge system for moving a closure panel relative to a vehicle body of a motor vehicle between open and closed positions includes a closure panel bracket configured for attachment to the closure panel. A mount bracket is configured for attachment to the vehicle body, and a hinge member is pivotably coupled to the closure panel bracket about a first axis of rotation and to the mount bracket about a second axis of rotation. The hinge member is configured to pivot about both the first axis of rotation and the second axis of rotation to allow the closure panel to move in a substantially X-direction, and is configured to pivot about one of the first axis of rotation and the second axis of rotation to allow the closure panel to substantially rotate about the one of the first axis of rotation and the second axis.

In accordance with further aspects of the disclosure, a hinge system for moving a closure panel relative to a vehicle body of a motor vehicle between open and closed positions includes a closure panel bracket configured for attachment to the closure panel, and a mount bracket configured for attachment to the vehicle body. A hinge member is pivotably coupled to the closure panel bracket about a first axis of rotation and to the mount bracket about a second axis of rotation, wherein the hinge member is configured to allow the closure panel to move away from the closed position having a substantially X-direction motion, and is configured thereafter to allow the closure panel to move away from the closed position having substantially rotational motion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF EXAMPLE EMBODIMENTS

Figure 1:
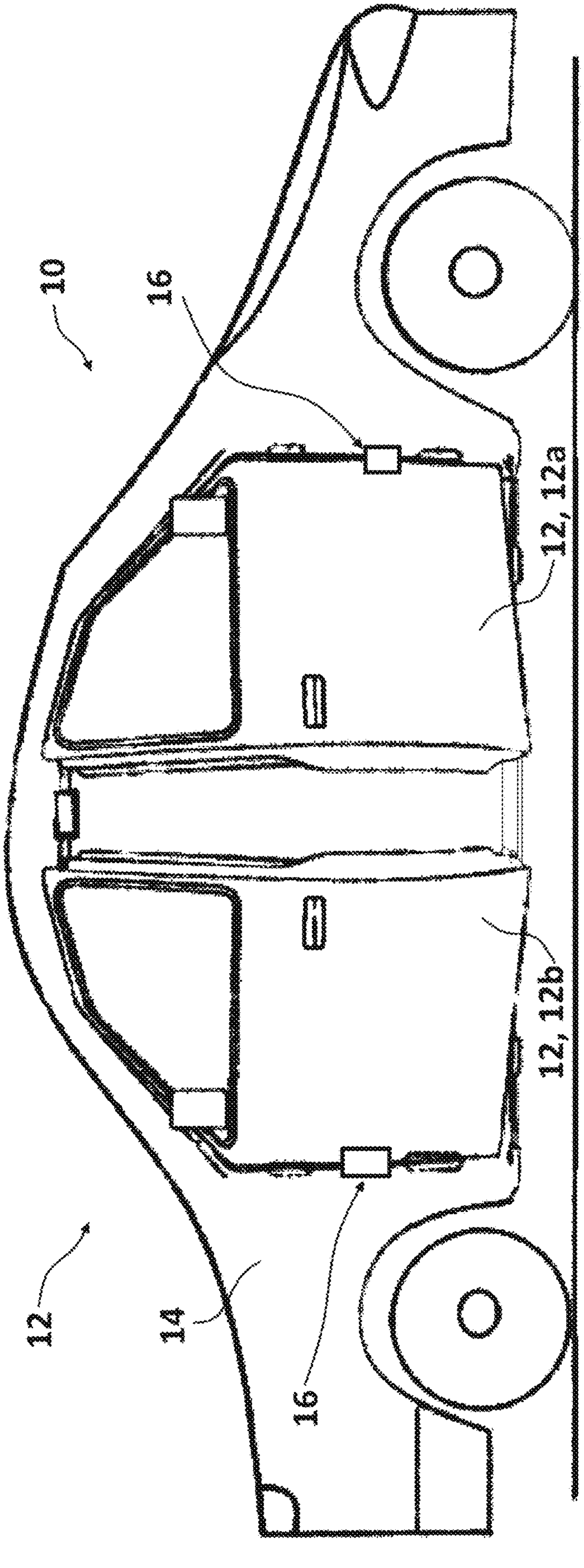
FIG. 1 is a schematic side view of a motor vehicle equipped with closure panels having hinge systems constructed according to the present disclosure.

Example embodiments will now be described more fully with reference to the accompanying drawings.

The present disclosure is directed to one or more embodiments of a hinge system for a closure panel, shown as swing doors on a B-pillarless motor vehicle, by way of example and without limitation. The hinge systems and closure panels therewith of the present disclosure and methods of installing/assembling such hinge systems and closure panels are clearly illustrated in the appended drawings and those skilled in the art will fully comprehend all aspects, features and improvements associated therewith.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1, an example motor vehicle 10 is shown to include one or more closure panels, shown by way of example and without limitation as front and rear passenger swing doors 12*a*, 12*b*, respectively, referred to hereafter simply as swing door or door 12, with each door 12 mounted to a vehicle body 14 via at least one hinge system 16 for movement between closed and open positions. Initial movement of the door 12 from the closed position toward the open position takes place during a primary stage of movement of the hinge system 16 from a first position, corresponding to the closed position of the door 12, toward a second position, corresponding to the open position of the door 12, causing the door 12 to move from the closed position along a first path. Then, during a secondary stage of movement of the hinge system 16, after the primary stage of movement, the door 12 is caused to move along a second path to the open position, wherein the first and second paths are different. The first path is substantially (vast majority of movement) in an X-direction, extending along a cross-vehicle direction of the motor vehicle 10, and the second path is generally about a single pivot axis, thereby being along a substantially constant radius circular path having both X direction and Y direction (extending along a lengthwise direction of the motor vehicle from the front end to the rear end) components.

The hinge system 16 includes a power actuator 18 having a drive member 20 moveable to an extended position, corresponding to the open position of door 12, and a retracted position, corresponding to the closed position of door 12. The power actuator 18 is actuatable via any selectively actuated mechanism, such as a door handle or other actuator of the motor vehicle 10, key fob, or the like. When the door 12 is in the closed position and the power actuator 18 is energized, the drive member 20 moves from the retracted position to the extended position, and when the door 12 is in the open position and the power actuator is energized, the drive member 20 moves from the extended position to the retracted position. It is contemplated herein that automated features can be configured in communication with the power actuator 18 to cause the drive member 20 to move toward the extended and retracted positions, such as sensors detecting an obstruction preventing the door 12 from moving to the open position, or otherwise.

The hinge system 16 includes a closure panel bracket 22 configured for attachment to the door 12. Closure panel bracket 22 can be fixed directly to door 12 via any suitable fixation mechanism, and is illustrated having a plurality of fastener openings 24 arranged for receipt of fasteners, such as screws or bolts (not shown) for fixation to a shut face of door 12, by way of example and without limitation.

The hinge system 16 includes a mount bracket 26 configured for attachment to the vehicle body 14, and is illustrated having a plurality of fastener openings 28 arranged for receipt of fasteners, such as screws or bolts (not shown) for fixation to vehicle body 14, by way of example and without limitation.

The hinge system 16 includes a hinge member 30 coupled to the closure panel bracket 22 and to the mount bracket 26. The hinge member 30 is pivotably coupled to the drive member 20, such that the hinge member 30 is free to pivot relative to the drive member 20 as the drive member 20 moves between retracted and extended positions. The hinge member 30 is shown as being generally U or C-shaped, having a first end 30*a* pivotably coupled to the mount bracket 26, such as via a first pin 32, and having a second end 30*b* pivotably coupled to the closure panel bracket 22, such as via a second pin 34.

Figure 2A:
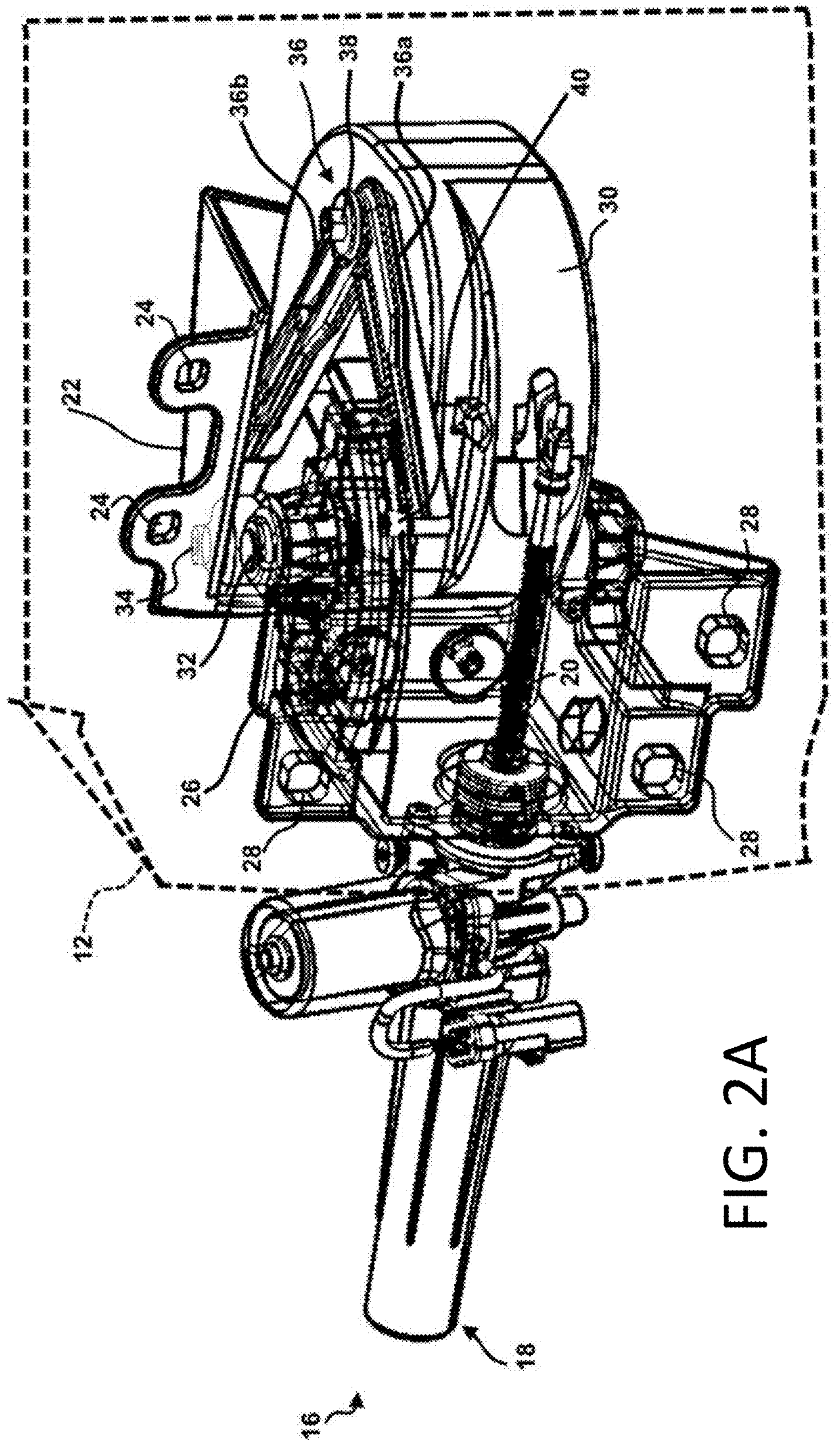
FIG. 2A is a front perspective view of a hinge system of FIG. 1 shown while the closure panel is in an open position.
Figure 2B:
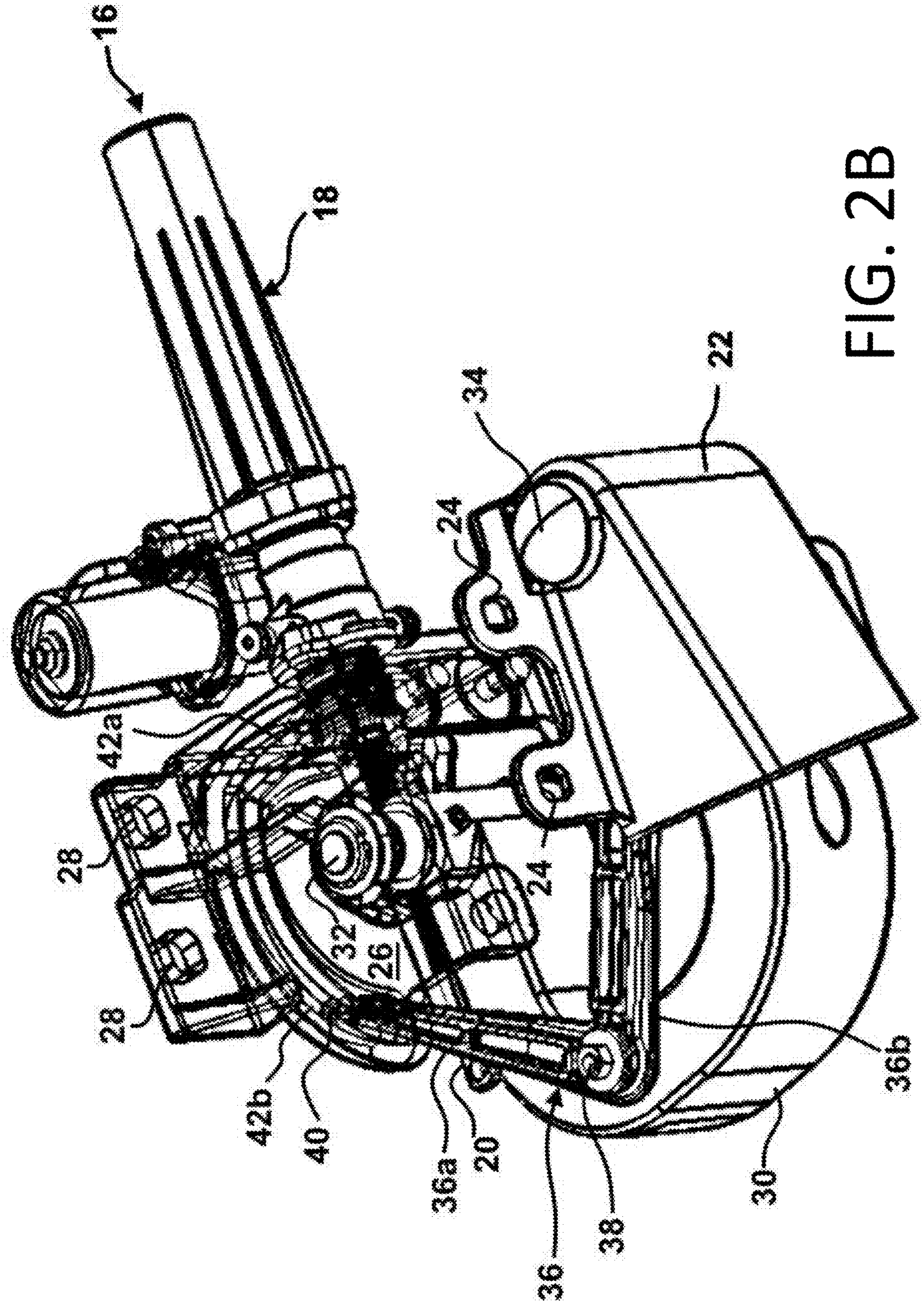
FIG. 2B is a rear perspective view of a hinge system of FIG. 2A.
Figure 3:
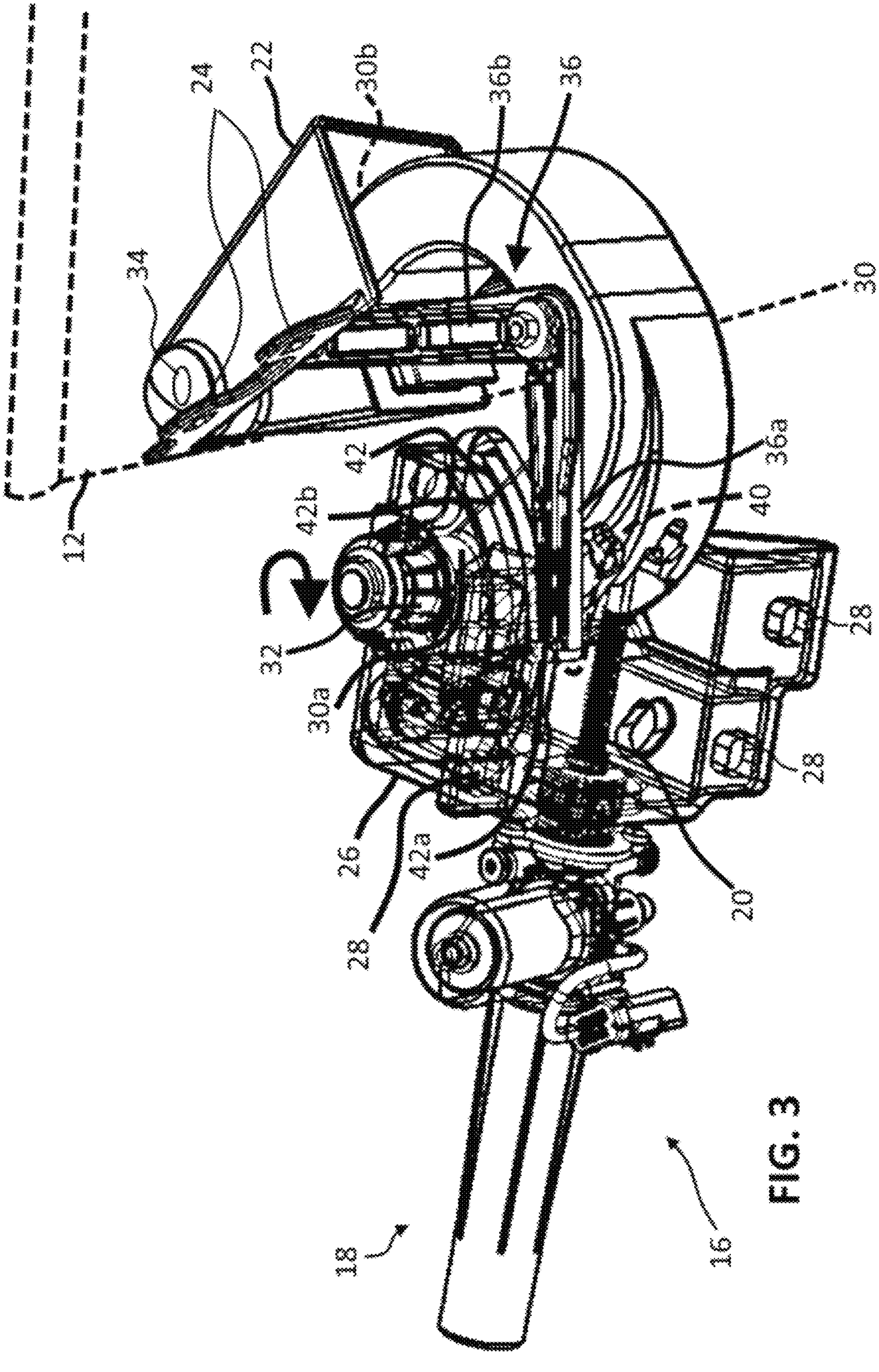
FIGS. 3 and 4 are similar to FIG. 2A, showing the closure panel being moved progressively from the open position toward a closed position.
Figure 4:
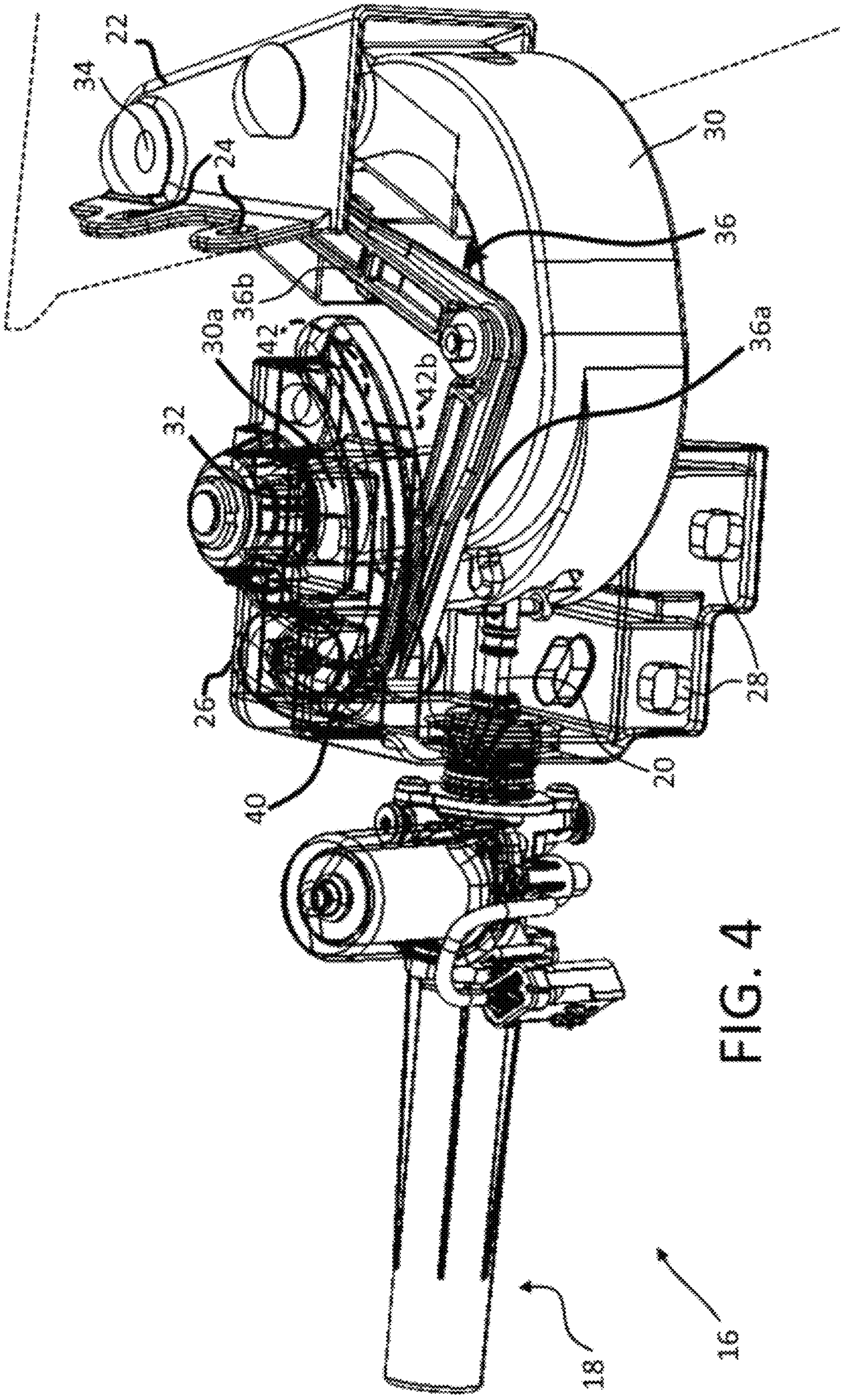
Figure 5:
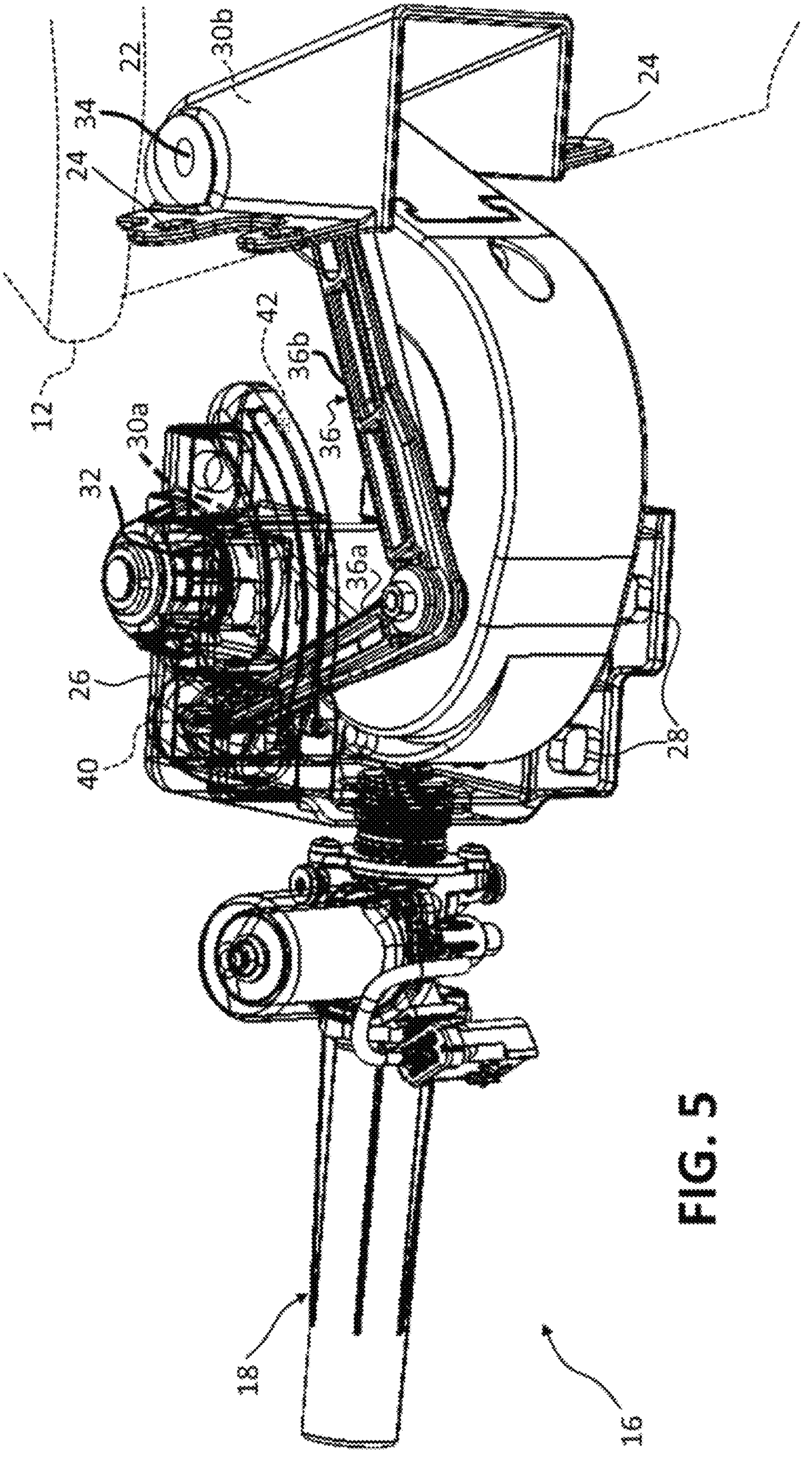
FIG. 5 is a view similar to FIG. 2A, showing the closure panel in the closed position.
Figure 6B:
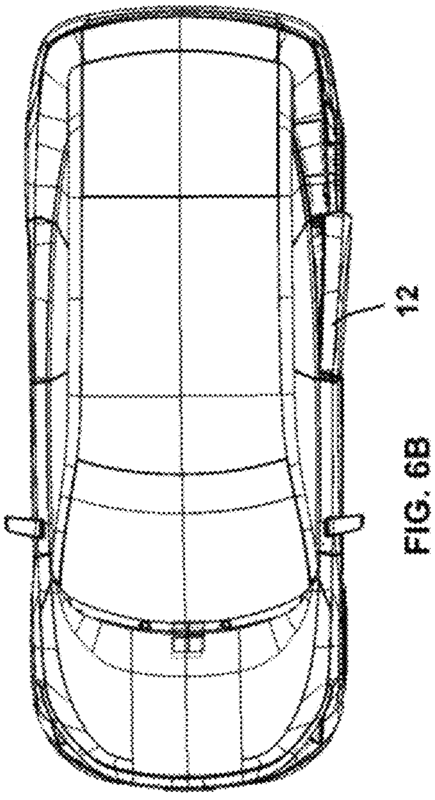
FIGS. 6A through 6D illustrate a closure panel being moved along a first path by the hinge system from the closed position toward an the opening position, with the first path being substantially along a lengthwise direction of the motor vehicle.
Figure 6D:
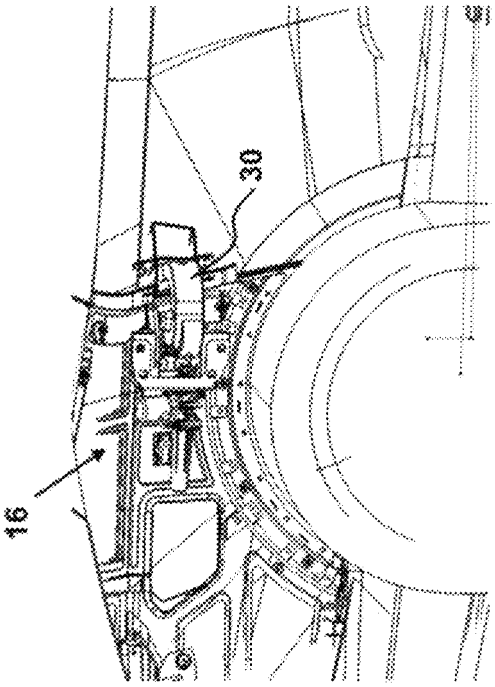
Figure 6A:
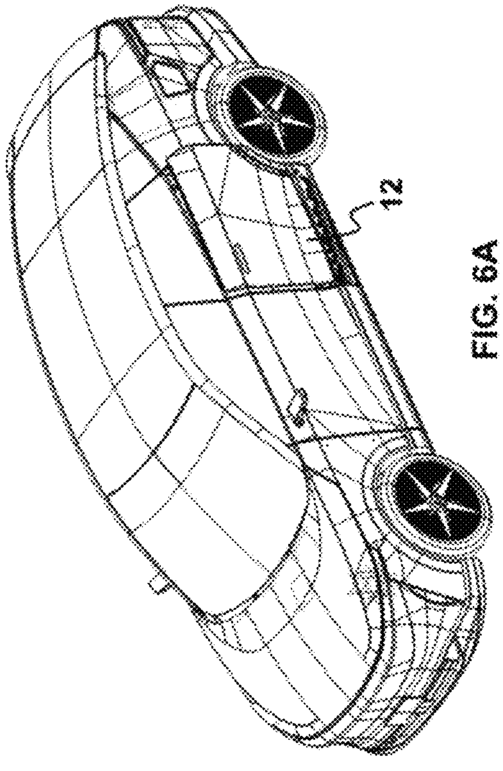
Figure 6C:
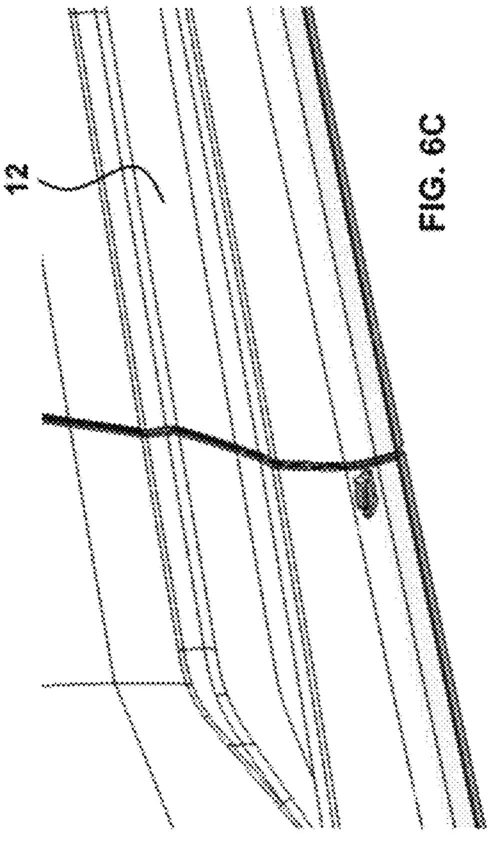
Figure 7A:
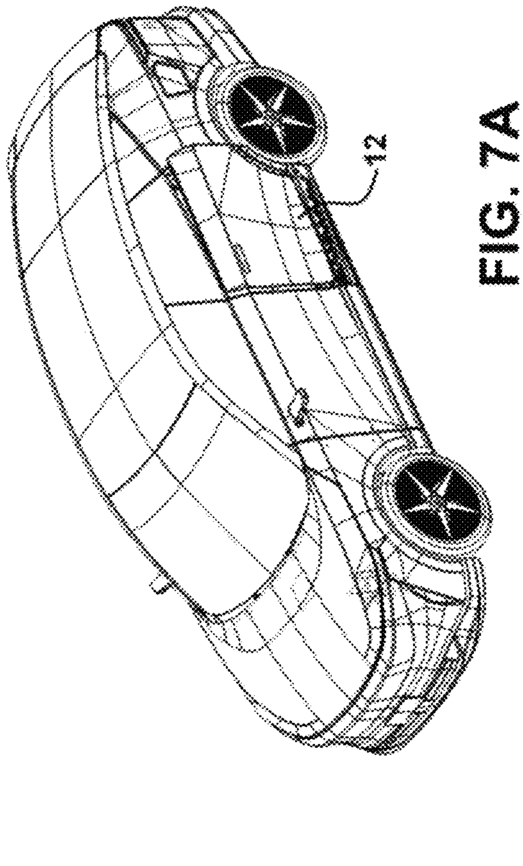
FIGS. 7A through 7D illustrate the closure panel upon being moved along the first path by the hinge system, whereupon the closure panel can be moved along a second path different from the first path.
Figure 7B:
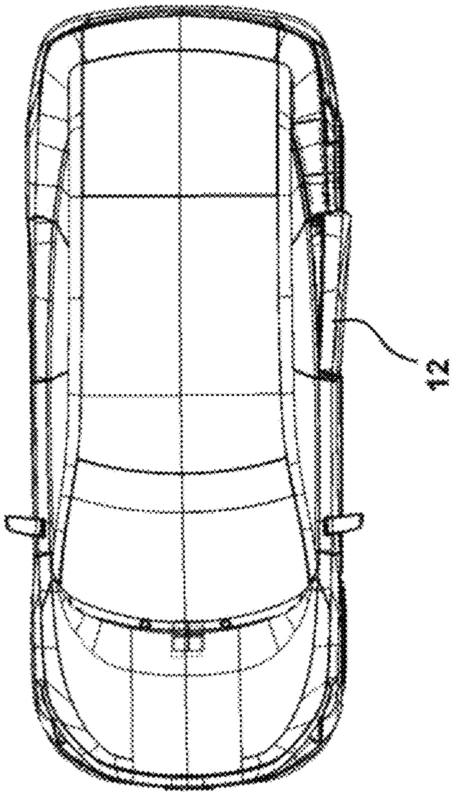
Figure 7C:
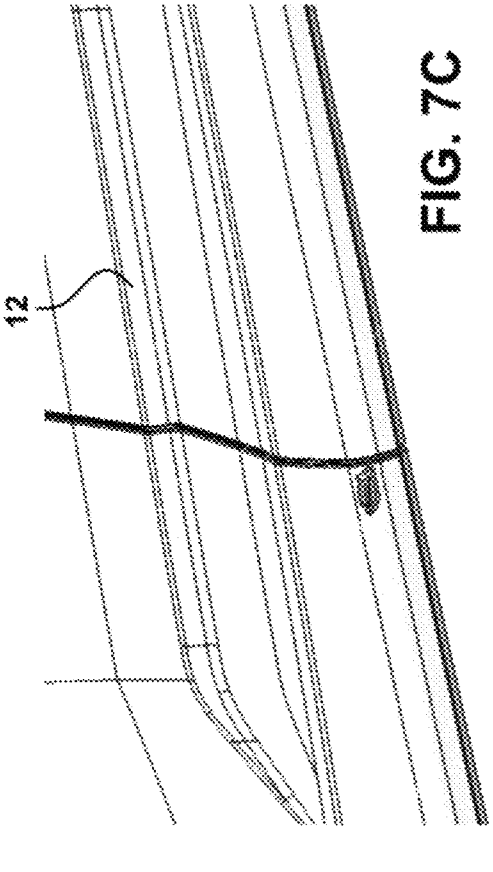
Figure 7D:
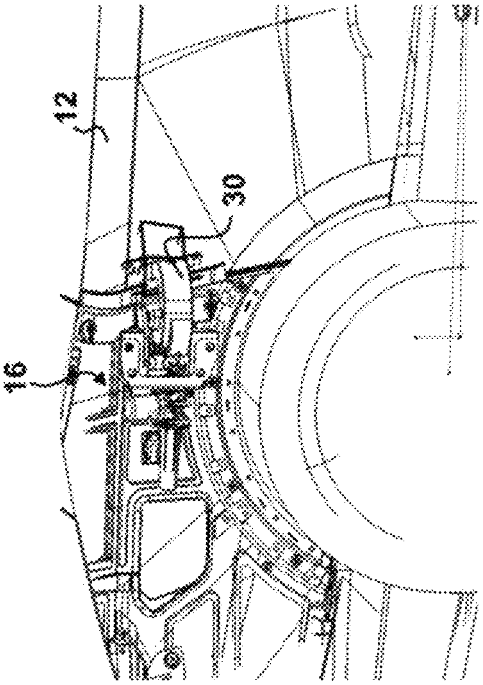
Figure 8B:
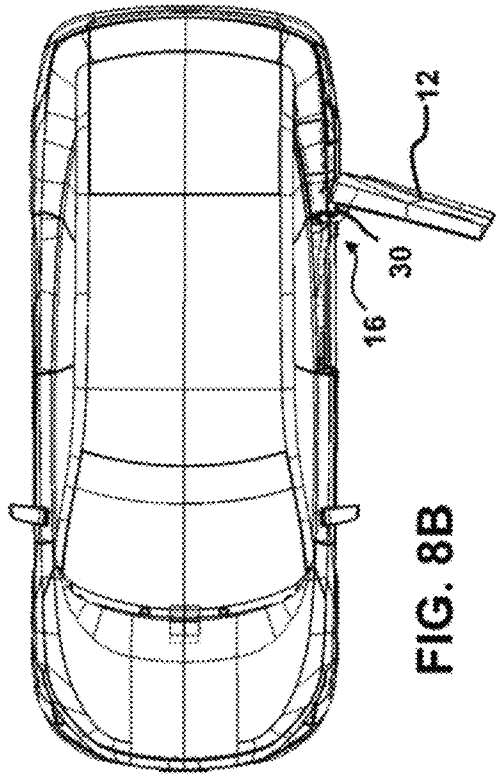
FIGS. 8A through 8D illustrate the closure panel upon being moved along the second path by the hinge system to the open position, with the second path following a substantially constant radius of curvature relative to a pivot axis.
Figure 8D:
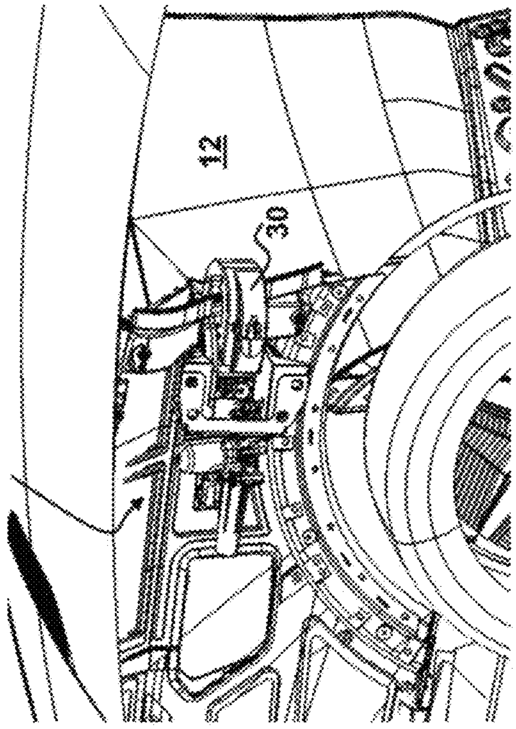
Figure 8A:
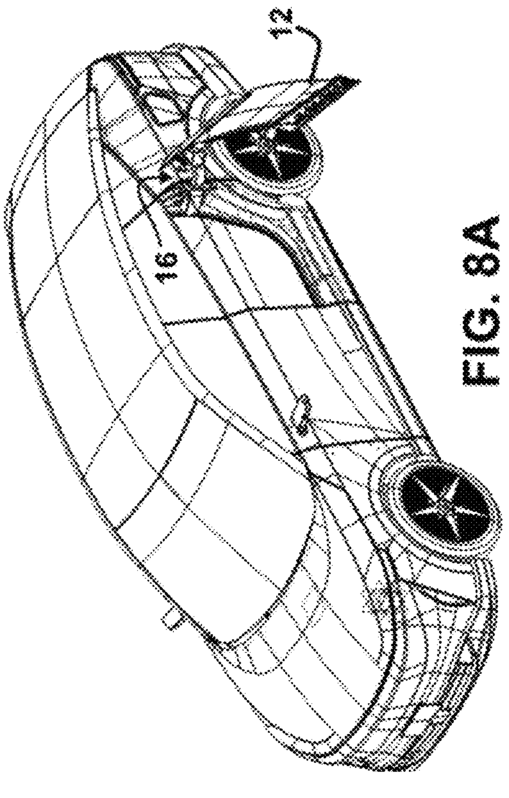
Figure 8C:
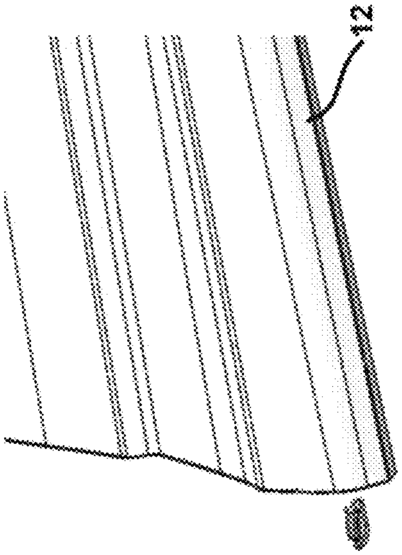

The hinge system 16 includes a link 36 pivotably coupled to the hinge member 30. The link 36 is shown as being generally L-shaped, having a first leg 36*a* and a second leg 36*b* extending away from a generally central pivot 38, wherein central pivot 38 is pivotably connected to a generally central region (generally midway between first and second ends 30*a*, 30*b*) of hinge member 30 via a central pin 38*a*. The first leg 36*a* of link 36 is coupled for translation relative to the mount bracket 26 and the second leg 36*b* of link 36 is coupled for translation relative to the closure panel bracket 22. In the non-limiting illustrated embodiment, the first leg 36*a* has a guide pin 40 arranged in sliding receipt within an arcuate channel, also referred to as track 42, of mount bracket 26. The track 42 has a first section 42*a* and a second section 42*b*. The first section 42*a* corresponds to and provides a primary stage of movement of the hinge member 30 as the door 12 is initially being moved away from the closed position to an initially, also referred to as partially opened position (corresponding to the primary stage of movement of the hinge member 30), and the second section 42*b* corresponds to and provides a secondary stage of movement of the hinge member 30 as the door 12 moves from the partially opened position to the fully open position. The first section 42*a* has a first geometric path of curvature and the second section 42*b* has a second geometric path of curvature, wherein the first and second geometric paths of curvatures are different. The first and second geometric paths of curvatures can be provided a radius of curvatures, including constant radius of curvature, by way of example and without limitation, that are different from one another. When the door 12 is in the closed position, the guide pin 40 is adjacent one end of track 42 (FIG. 5), and when the door 12 is in the open position, the guide pin 40 is adjacent an opposite end of track 42 (FIGS. 2A, 2B).

The hinge member 30 is moveable from a first position corresponding to the closed position of the closure panel 12 to a second position corresponding to the open position of the closure panel 12. During the primary stage of movement of the hinge member 30 from the first position toward the second position, the hinge member 30 pivots relative to the closure panel bracket 22, causing the closure panel 12 to move from the closed position along the first path generally in the cross-vehicle direction (X-direction), and thus, a hinged edge of the door 12 is moving in generally straight translation, which can be purely or nearly (substantially) straight outwardly from the vehicle body 14. During a secondary stage of movement of the hinge member 30 toward the open position, after the primary stage of movement, the hinge member 30 and the closure panel bracket 22 move conjointly in fixed relation with one another, causing the closure panel 12 to move along the second path to the open position, with the first and second paths being different. The first path can be provided to traverse a varying radius of movement and to extend generally in the cross-vehicle X-direction, while the second path can be provided to traverse a generally constant radius of movement and to extend along a generally constant radius circular path, comprised generally equally of X-direction and Y-direction movement. Accordingly, movement of door 12 between the closed position and the open position includes movement of door 12 about 2 separate paths and axes at separate times from one another.

Figure 9:
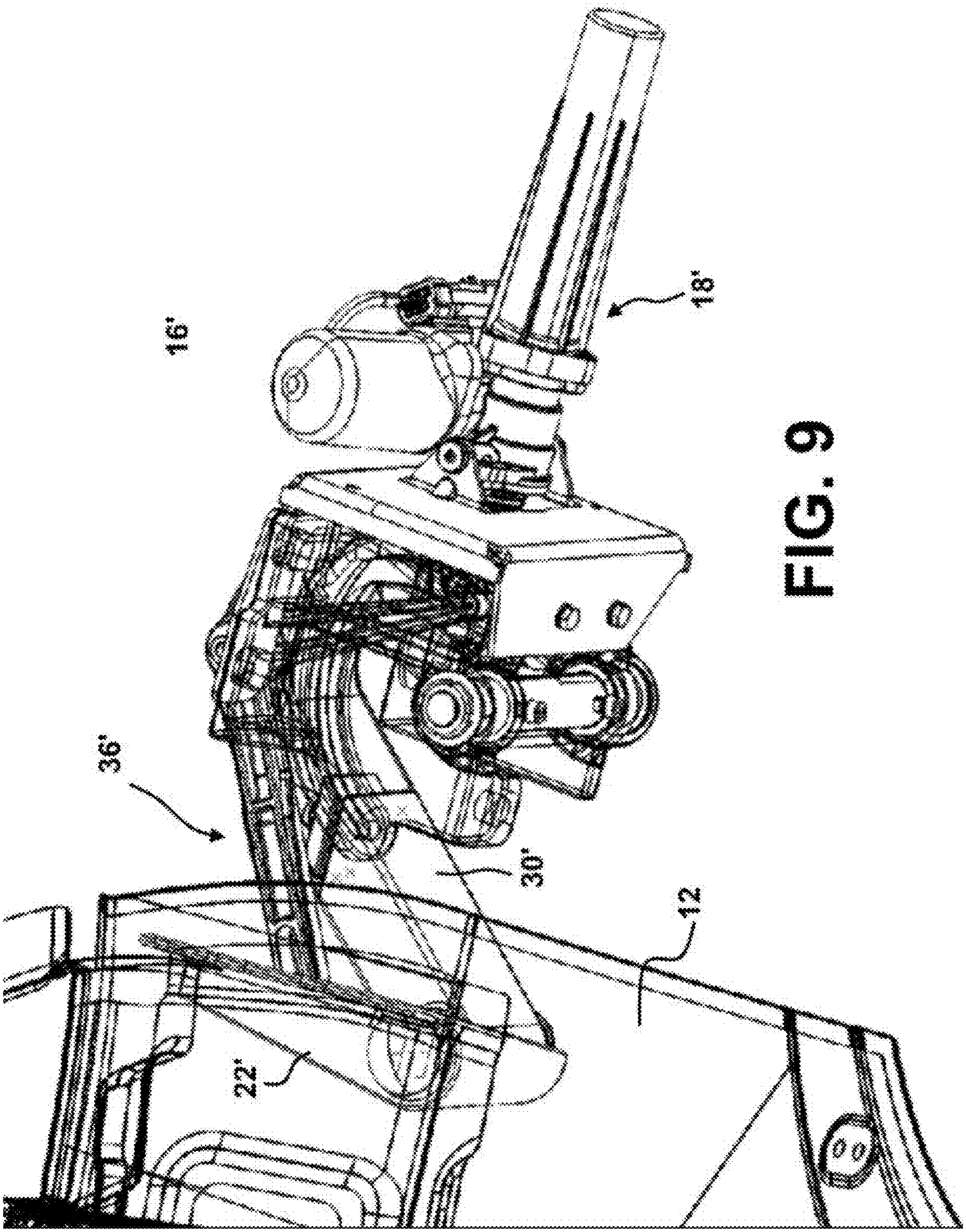
FIGS. 9 through 11 illustrate another embodiment of a hinge system in accordance with the disclosure.
Figure 10:
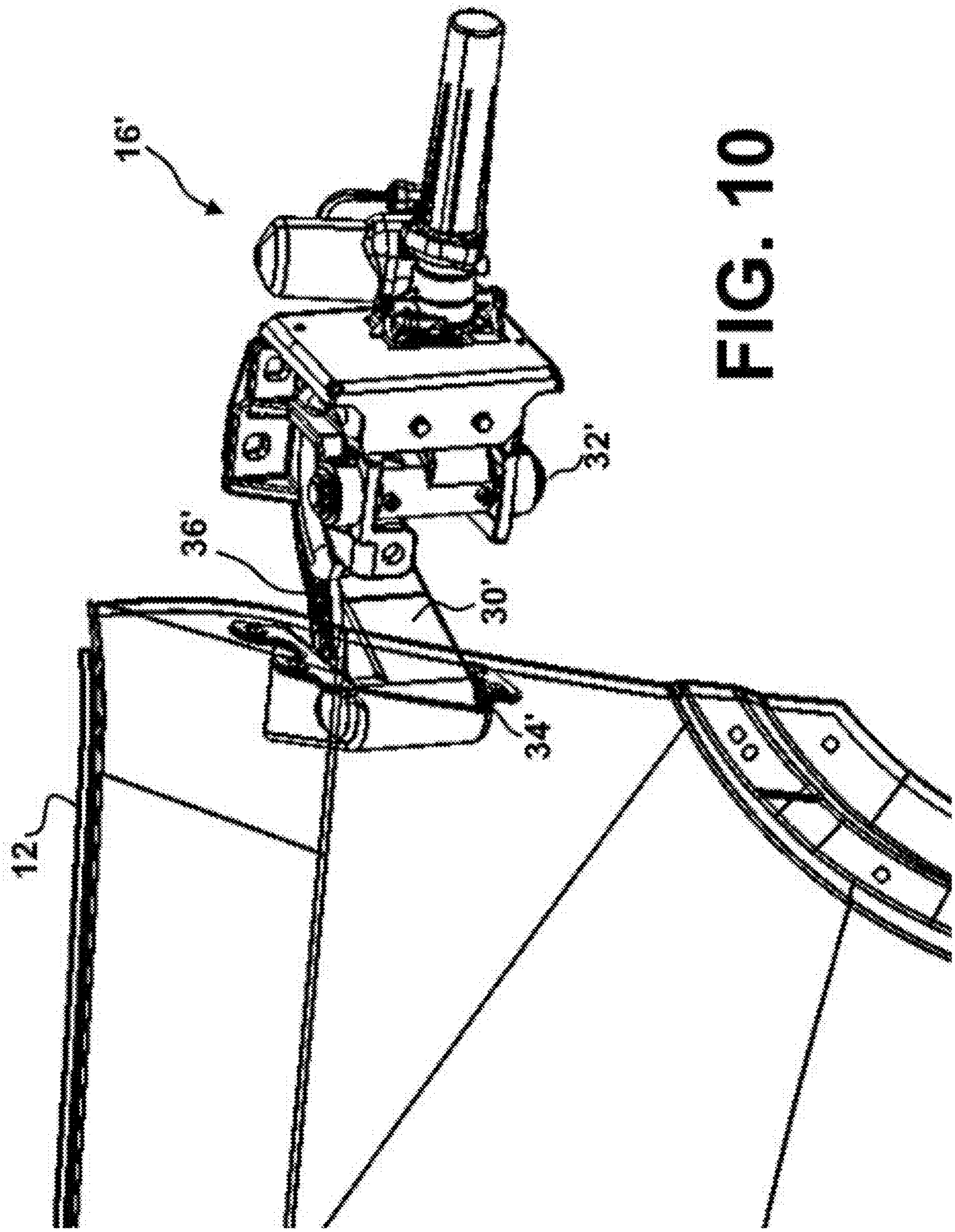
Figure 11:
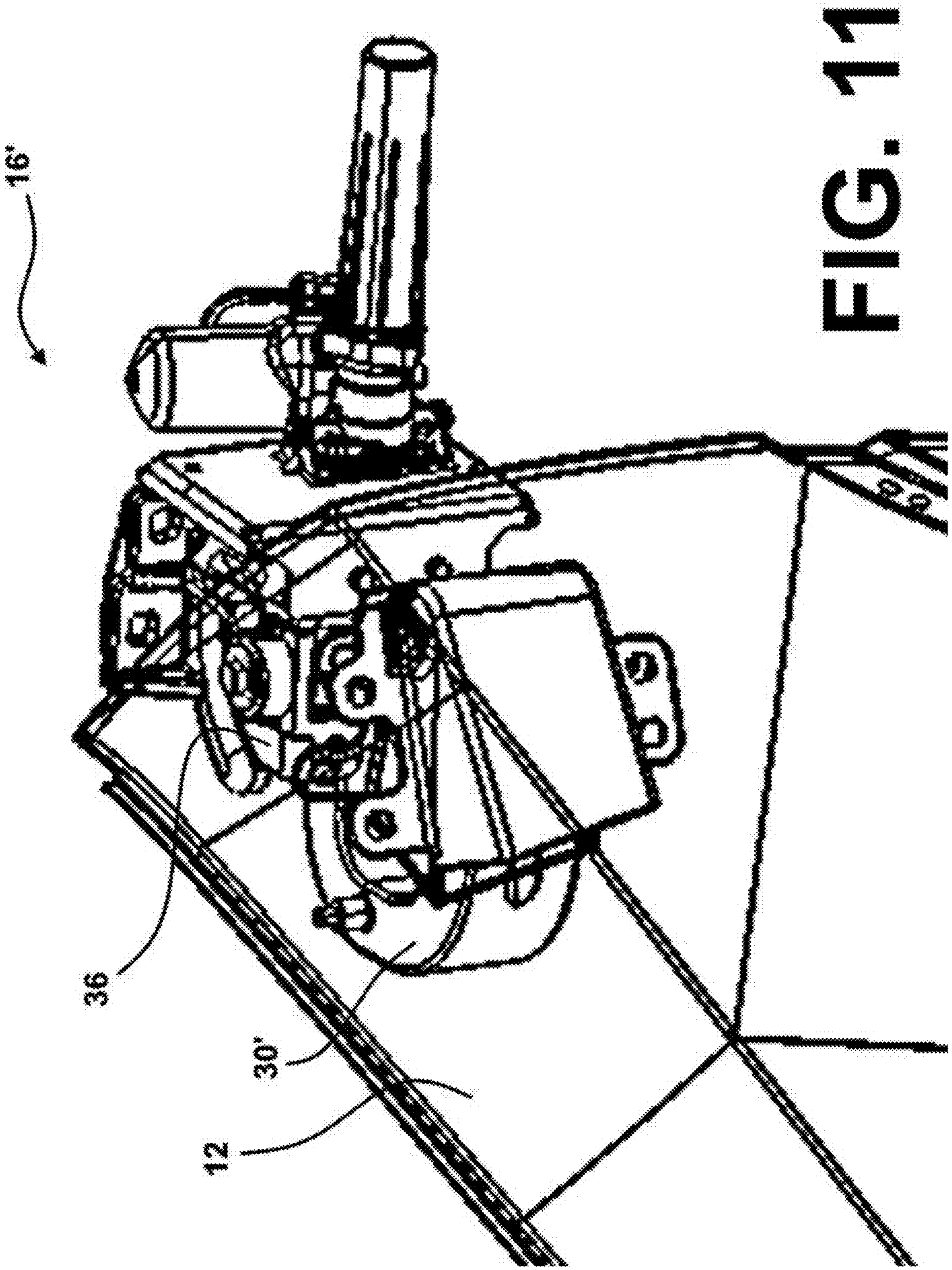

In FIGS. 9 through 11, and alternate embodiment of a hinge system 16' is shown. The hinge system 16' is different from hinge system 16 in that a control linkage, also referred to as link 36', is not pivotably connected to the door 12 and has a moveable pivot axis with the vehicle body 14. In FIG. 9, door 12 is shown in a closed position. The link 36' is guided by a control slot, also referred to as control track, as discussed above for track 42, wherein link 36' provides for movement of door 12 in the X-direction during initial opening movement of door 12. In FIG. 10, door 12 is shown in a partially open position, whereupon a hinge member 30' and link 36' provide pivoting movement in unison such that door 12 moves in pure pivoting fashion about axis A of pivotal connection of mount bracket 26' with hinge member 30', thereby providing a single axis A of rotation of door 12 with vehicle body 14. In FIG. 11, door 12 is shown in a fully open position, whereat hinge member 30' and link 36' to not move relative to one another, thereby locking the door axis A of rotation for pivoting movement only.

In FIGS. 12-15, a hinge system 116 constructed in accordance with another aspect of the disclosure is shown, wherein the same reference numerals, offset by a factor of 100, are used to identify like features. Hinge system 116 includes a control arm, also referred to as closure panel bracket 122, configured for attachment to the closure panel, such as door or a deck lid 12, by way of example and without limitation. Closure panel bracket 122 can be fixed to deck lid 12 via any suitable fixation mechanism, as discussed above for closure panel bracket 22.

The hinge system 116 includes a mount bracket 126 configured for attachment to the vehicle body 14, such as discussed above for mount bracket 26.

The hinge system 116 includes a goose neck, also referred to as hinge member 130, pivotably coupled to the closure panel bracket 122 and to the mount bracket 126. The hinge member 130 is pivotably coupled to a drive member (not shown), as discussed above for hinge member 30, such that the hinge member 130 is free to pivot relative to the drive member as the drive member moves between retracted and extended positions. The hinge member 130 is shown as being generally U or C-shaped, having a first end **130*a* pivotably coupled to the mount bracket 126, such as via a first pin 132, and having a second end 130*b* pivotably coupled to the closure panel bracket 122, such as via a second pin 134**.

Figure 15:
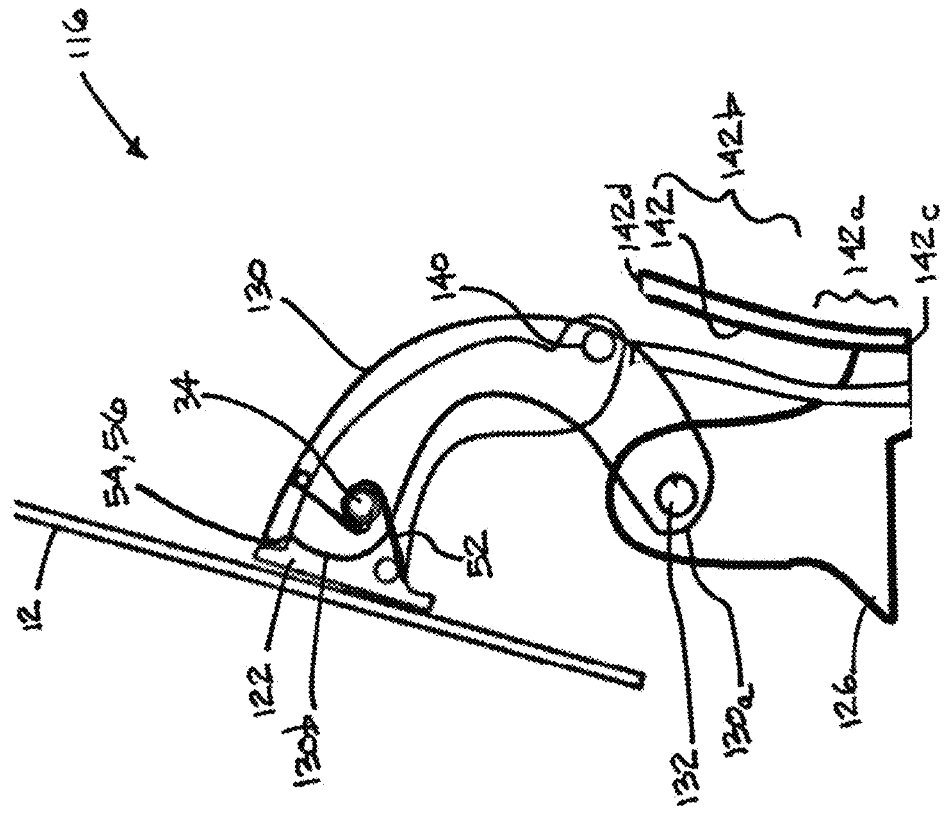
FIG. 15 illustrates continued movement from FIG. 14 of the closure panel from the intermediate stage of opening to an open position.
Figure 14:
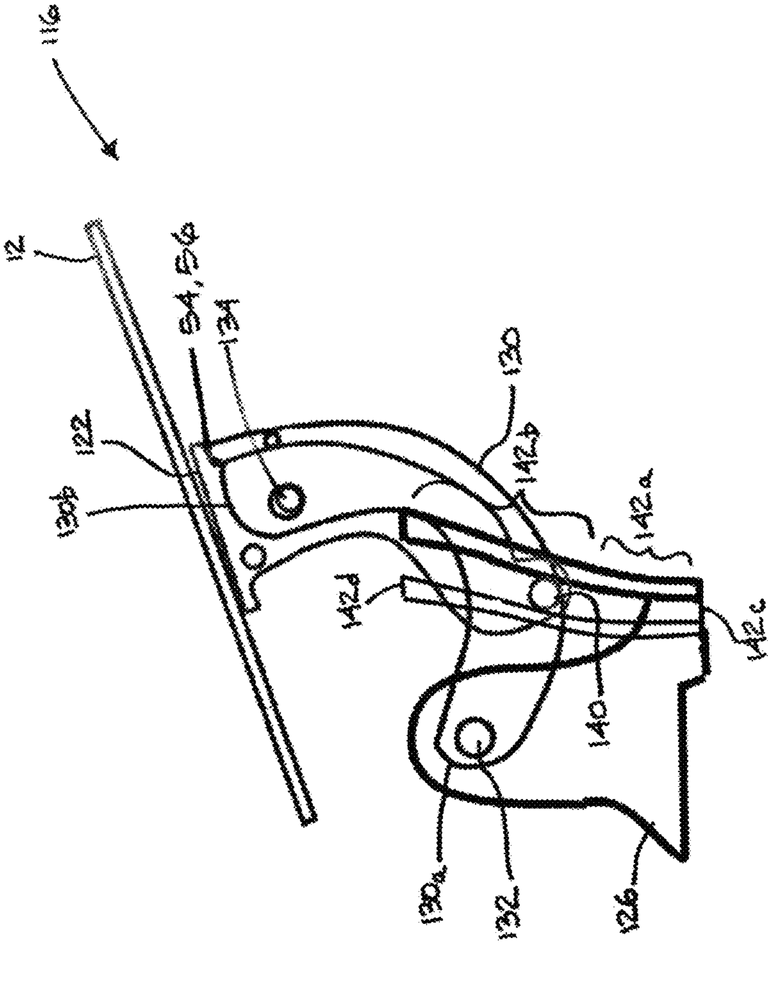
FIG. 14 illustrates continued movement from FIG. 13 of the closure panel from the initiate stage of opening to an intermediate stage of opening.
Figure 16:
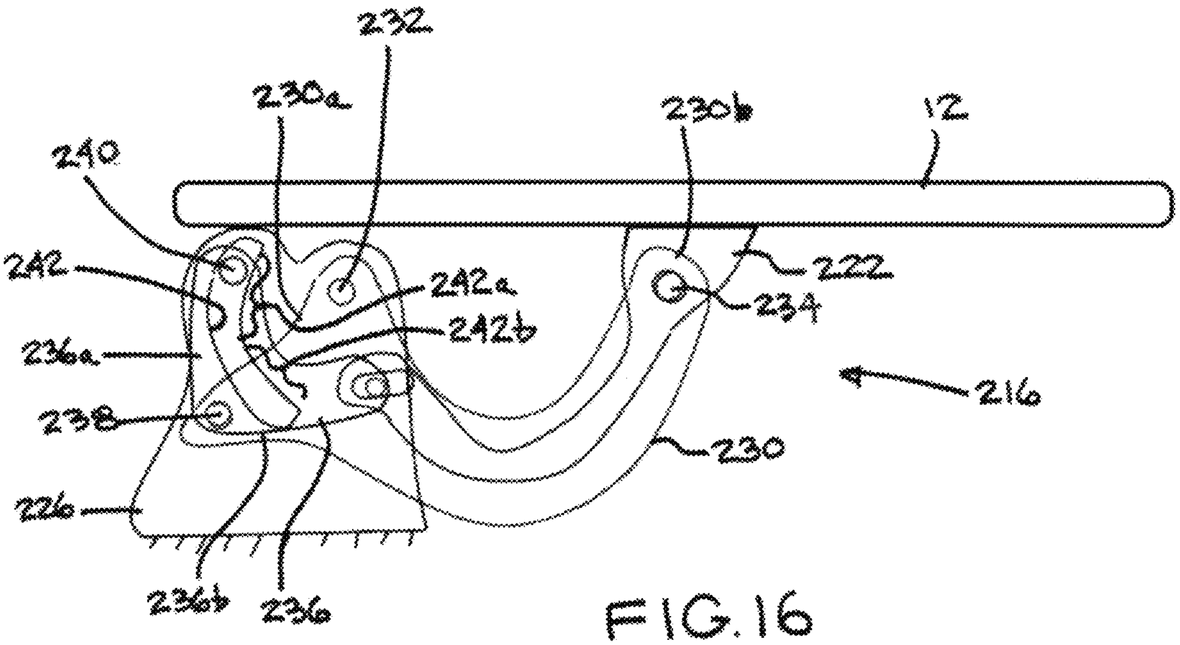
FIG. 16 is a side view of a hinge system of FIG. 1 in accordance with yet another aspect of the disclosure shown while the closure panel is in a closed position.
Figure 17:
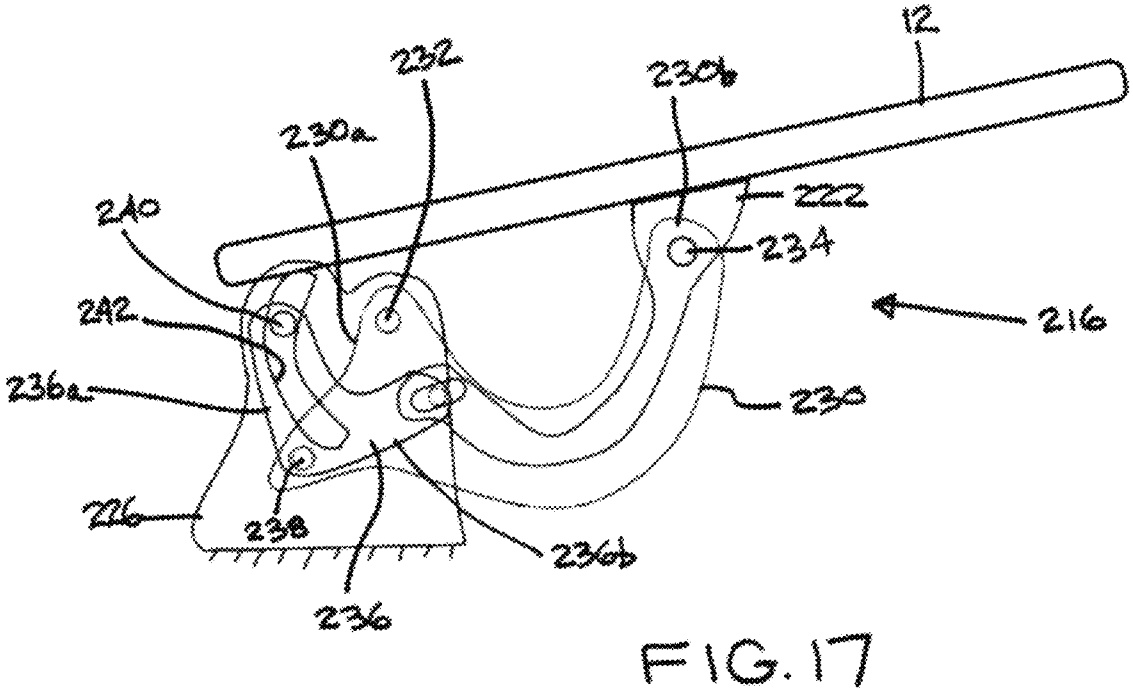
FIG. 17 is a view similar to FIG. 16 illustrating the hinge system during an initial stage of the closure panel moving away from the closed position.
Figure 18:
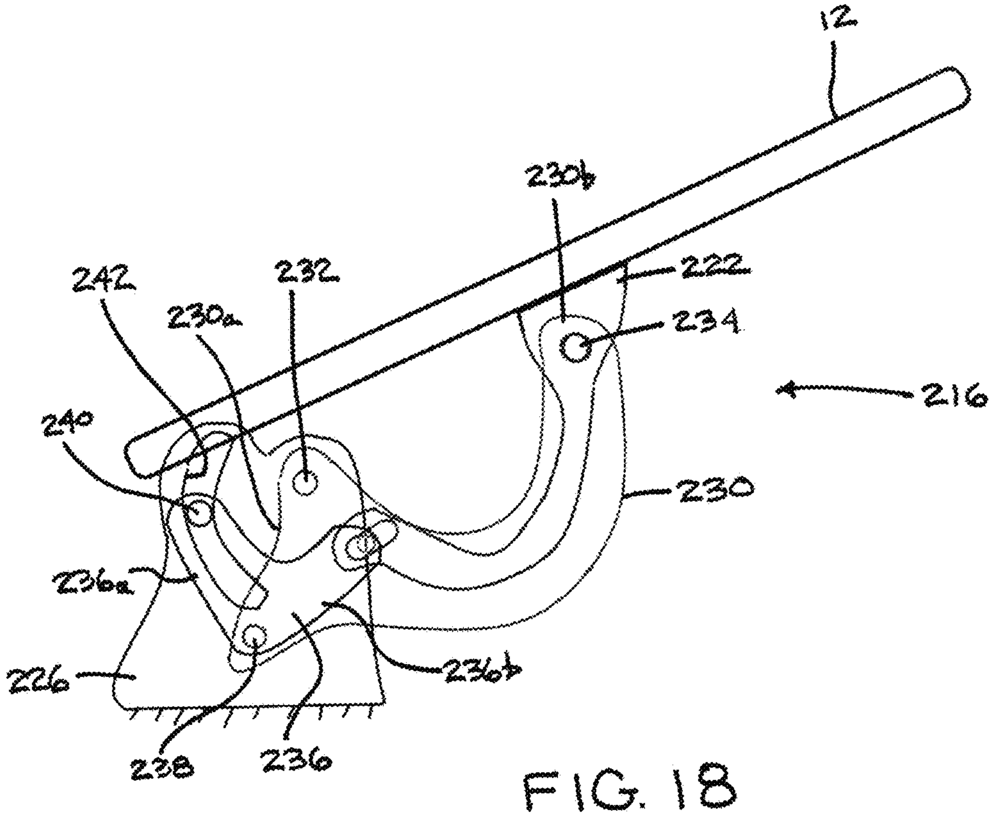
FIG. 18 illustrates continued movement from FIG. 17 of the closure panel from the initiate stage of opening to an intermediate stage of opening.

The hinge system 116 includes a guide pin 140 arranged in sliding receipt within an arcuate channel, also referred to as cam surface, cam track, guide channel, channel or track 142 of a cam member 50, wherein cam member 50 can be formed as a monolithic piece of material with mount bracket 126, or formed as a separate piece of material from mount bracket 126, and subsequently fixed relative to mount bracket 126, such as to a surface of vehicle body 14. The track 142 has a first section **142*a* and a second section 142*b*. The first section 142*a* corresponds to a primary stage of movement of the hinge member 130 as the door 12 is initially being moved away from the closed position, as shown between FIGS. 12 and 13, and the second section 142*b* corresponds to a secondary stage of movement of the hinge member 130 as the door 12 moves from the from an initially opened position (corresponding to the primary stage of movement of the hinge member 130) to the fully open position, as shown between FIGS. 13 and 15. The first section 142*a* has a first radius of curvature and the second section 142*b* has a second radius of curvature, wherein the first and second radius of curvatures are different. When the door 12 is in the closed position, the guide pin 140 is adjacent one end 142*c* of track 142 (FIG. 12), and when the door 12 is in the open position, the guide pin 140 is adjacent an opposite end 142*d* of track 142, and is shown as exiting track 142 (FIG. 15**).

Figure 12:
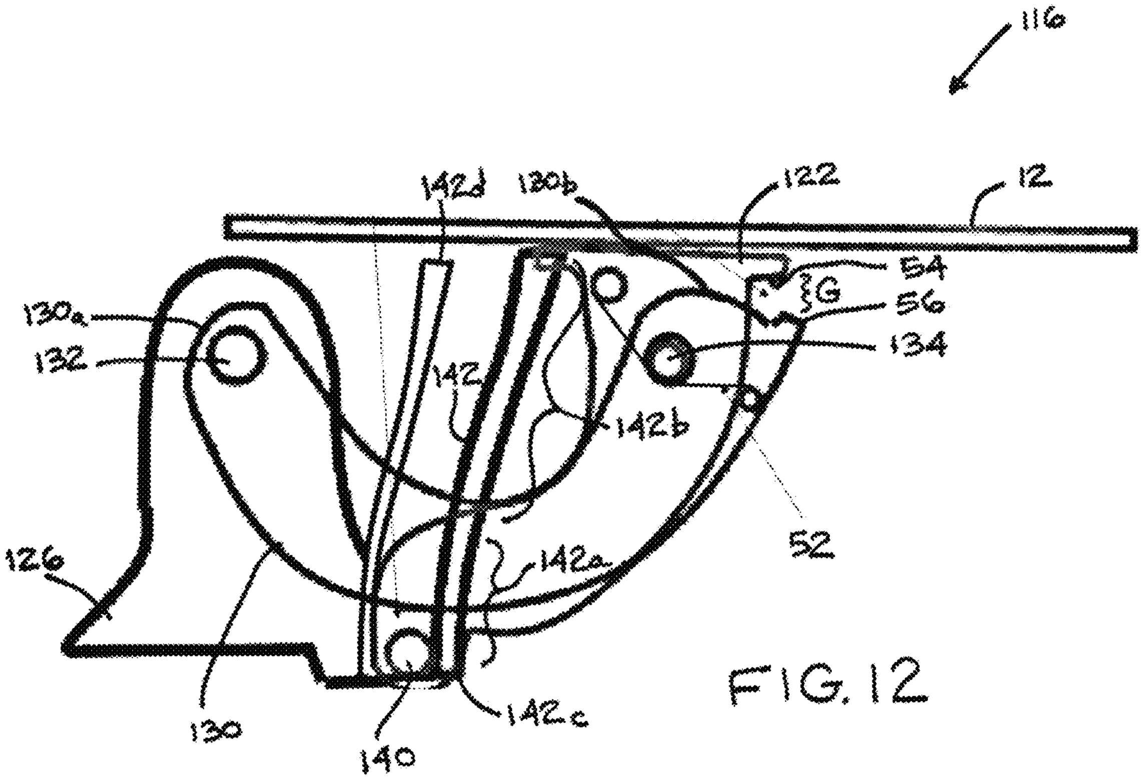
FIG. 12 is a side view of a hinge system of FIG. 1 in accordance with another aspect of the disclosure shown while the closure panel is in a closed position.
Figure 13:
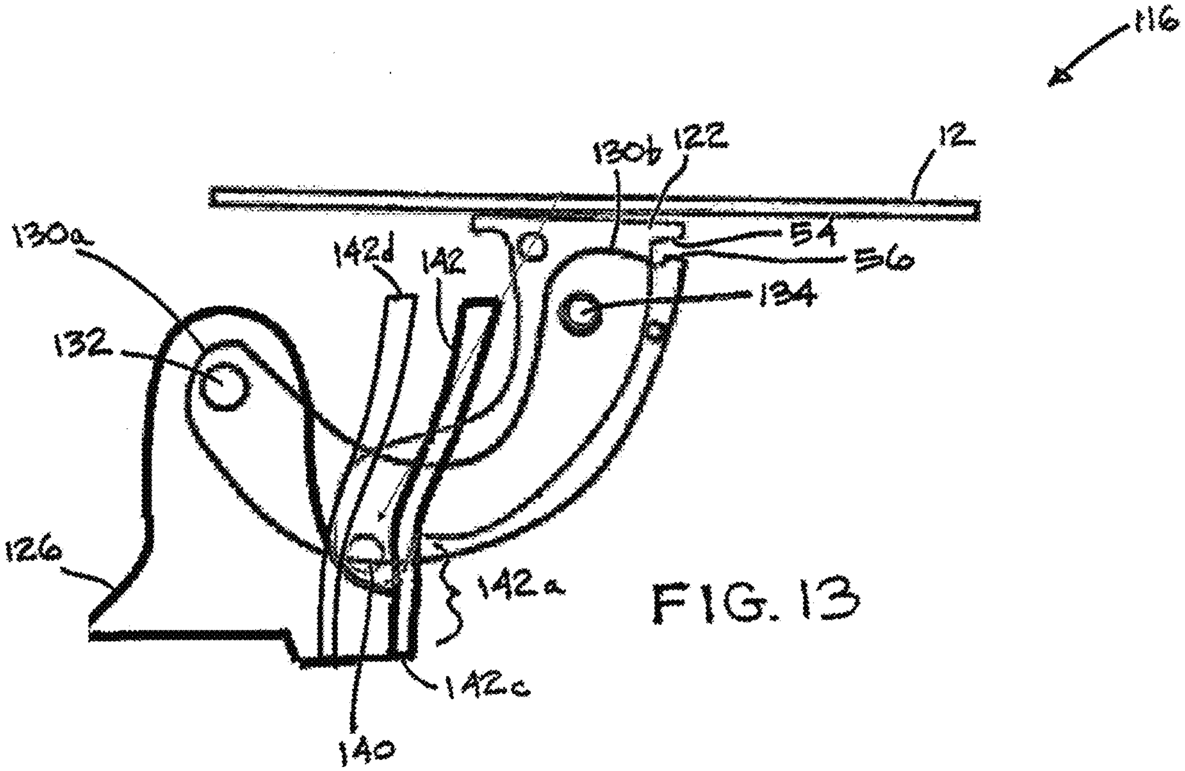
FIG. 13 is a view similar to FIG. 12 illustrating the hinge system during an initial stage of the closure panel moving away from the closed position.

During the primary stage of movement of the hinge member 130 as the door 12 is initially being moved away from the closed position, as shown between FIGS. 12 and 13, pin 140 rides against track 142, wherein the contour (path) of first section **142*a* of track 142 prevents or substantially prevents (meaning that any rotation is significantly less than pure rotation about a constant radius path or curvature, but is more closely related to linear translation) rotation of closure panel bracket 122, and thus, closure panel bracket 122 and door 12 move conjointly upwardly along a cross-vehicle X-direction as pin 140 traverses the first section 142*a* of track 142. During this movement, although door 12 is moving mostly, if not entirely, in translation, a spring member 52 imparts a bias on closure panel bracket 122 and hinge member 130 to causes relative rotation therebetween, thus, causing a gap G between a stop surface 54 of closure panel bracket 122 and a nose, also referred to as cog or protrusion 56 of hinge member 130 to be closed up completing of the primary stage of movement of the hinge member 130. Then, as hinge member 130 enters the secondary stage of movement, when pin 122 enters the second section 142*b* of track 142 (FIG. 14), whereat track 142 tends to move pin 140 away from pin 132 along an arcuate path, and whereupon stop surface 54 is engaged by protrusion 56 (FIGS. 14 and 15), hinge member 130 and closure panel bracket 122 are caused to move conjointly with one another in rotation about an axis of pin 132, thereby causing door 12 to move along a generally constant radius circular path, comprised generally equally of X and Y-directions. Then, as shown in FIG. 15, pin 140 can ultimately exit track 142, whereupon only the force imparted by spring 52 acts to control the pivoting movement of closure panel bracket 122 and hinge member 130, and thus, only a single point of rotation occurs at the axis of pin 132 between hinge member 130 and mount bracket 126. Accordingly, movement of door 12 between the closed position and the open position includes movement of door 12** about 2 separate axes at separate times from one another, one during initial, primary movement away from the closed position to a partially open position, and the other during secondary movement from the partially open position to the open position.

In FIGS. 16-19, a hinge system 216 constructed in accordance with another aspect of the disclosure is shown, wherein the same reference numerals, offset by a factor of 200, are used to identify like features. Hinge system 216 includes a closure panel bracket 222 configured for attachment to the closure panel, such as door or a deck lid 12, by way of example and without limitation. Closure panel bracket 222 can be fixed to deck lid 12 via any suitable fixation mechanism, as discussed above for closure panel bracket 22.

The hinge system 216 includes a mount bracket 226 configured for attachment to the vehicle body 14, can be fixed to vehicle body 14 via any suitable fixation mechanism, as discussed above for mount bracket 26.

The hinge system 16 includes a hinge member 230 pivotably coupled to the closure panel bracket 222 and to the mount bracket 226. The hinge member 230 is pivotably coupled to a drive member (not shown), such that the hinge member 230 is free to pivot relative to the drive member, as discussed above for hinge member 30 and drive member 20, as the drive member moves between retracted and extended positions. The hinge member 230 is shown as being generally U or C-shaped, having a first end 230*a* pivotably coupled to the mount bracket 226, such as via a first pin 232, and having a second end 230*b* pivotably coupled to the closure panel bracket 222, such as via a second pin 234.

Figure 19:
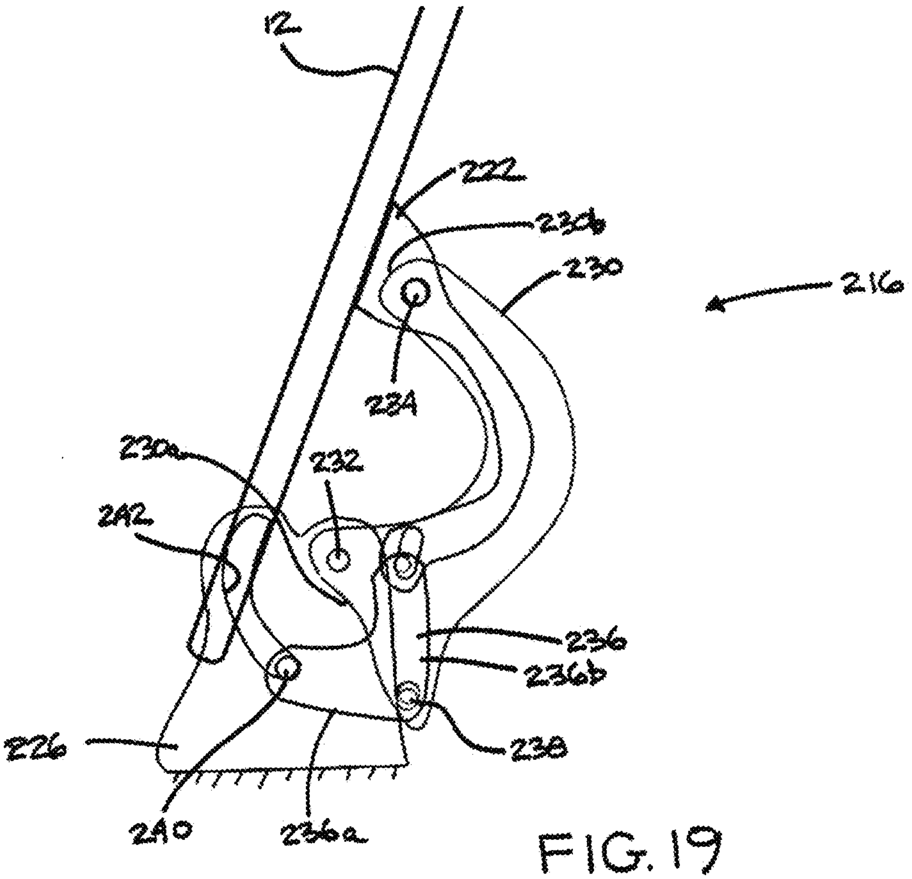
FIG. 19 illustrates continued movement from FIG. 18 of the closure panel from the intermediate stage of opening to an open position.

The hinge system 16 includes a link 236 pivotably coupled to the hinge member 230. The link 236 is shown as being generally L-shaped, having a first leg 236*a* and a second leg 236*b* extending away from a generally central pivot 238, wherein central pivot 238 is pivotably connected adjacent first end 230*a* of hinge member 230. The first leg 236*a* of link 236 is coupled for translation relative to the mount bracket 226 and the second leg 236*b* of link 236 is coupled for translation relative to the closure panel bracket 222. In the non-limiting illustrated embodiment, the first leg 236*a* has a guide pin 240 arranged in sliding receipt within an arcuate channel, also referred to as track 242, of mount bracket 226. The track 242 has a first section 242*a* and a second section 242*b*. The first section 242*a* corresponds to a primary stage of movement of the hinge member 230 as the door 12 is initially being moved away from the closed position, and the second section 242*b* corresponds to a secondary stage of movement of the hinge member 230 as the door 12 moves from the from an initially opened position (corresponding to the primary stage of movement of the hinge member 230) to the fully open position. When the door 12 is in the closed position, the guide pin 240 is adjacent one end of track 242 (FIG. 16), and when the door 12 is in the open position, the guide pin 240 is adjacent an opposite end of track 242 (FIG. 19).

The notable distinction between hinge system 16 and hinge system 216 is with regard to the location of respective links 36, 236. With hinge system 16, link 16 is pivotably coupled to hinge member 30 at an approximate midsection of hinge member 30, whereas link 216 is pivotably coupled to hinge member 230 adjacent first end 230*a* of hinge member 230. Further, the hinge member 230 and link 236 form a multi-link structure, which allows the track 242 to be shifted to a different position, shown as being to the left of first pin 232, as viewed in FIGS. 16-19.

The hinge systems 16, 116, 216 provide movement of closure panel 12 relative to vehicle body 14 of motor vehicle 10 between open and closed positions, wherein closure panel bracket 22, 112, 222 is configured for attachment to the closure panel 12, and mount bracket 26, 126, 226 is configured for attachment to vehicle body 14. Hinge member 30, 130, 230 is pivotably coupled to the closure panel bracket 22, 112, 222 about a first axis of rotation and to the mount bracket 26, 126, 226 about a second axis of rotation. The hinge member 30, 130, 230 is configured to allow the closure panel 12 to move away from the closed position having a substantially X-direction motion, and is configured thereafter to allow the closure panel 12 to move away from the closed position having substantially rotational motion.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hinge system for moving a closure panel relative to a vehicle body of a motor vehicle between an open position and a closed position, comprising:

- a closure panel bracket configured for attachment to the closure panel;
- a mount bracket configured for attachment to the vehicle body;
- a link coupled for movement relative to the mount bracket and for movement relative to the closure panel bracket; and
- a hinge member pivotably coupled to the link and operably coupled to the closure panel bracket for movement about a first axis of rotation and to the mount bracket for movement about a second axis of rotation, wherein the hinge member is configured to allow the closure panel to move away from the closed position during a primary stage of movement having a first direction motion, and is configured thereafter to move during a secondary stage of movement having a second direction motion different than the first direction motion, wherein the first direction motion is a substantially straight cross-vehicle X-direction motion, and the second direction motion is a cross-vehicle X-direction and a lengthwise vehicle Y-direction motion.

2. The hinge system of claim 1, wherein the mount bracket has a track along which the link translates as the hinge member moves between a first position corresponding to the closed position of the closure panel and a second position corresponding to the open position of the closure panel.

3. The hinge system of claim 2, wherein the track has a first section and a second section, the first section corresponding to the primary stage of movement of the hinge member and the second section corresponding to the secondary stage of movement of the hinge member.

4. The hinge system of claim 3, wherein the first section and the second section have different radius of curvatures.

5. The hinge system of claim 4, wherein the second section has a constant radius of curvature.

6. The hinge system of claim 1, wherein the link translates relative to the closure panel bracket during the primary stage of movement of the hinge member.

7. The hinge system of claim 6, wherein the link is substantially fixed relative to the closure panel bracket during the secondary stage of movement of the hinge member.

8. The hinge system of claim 6, wherein the first direction motion traverses a varying radius of movement and the second direction motion traverses a substantially constant radius of movement.

9. A hinge system for moving a closure panel relative to a vehicle body of a motor vehicle between open and closed positions, comprising:

a power actuator having a drive member moveable to an extended position and a retracted position;

a closure panel bracket configured for attachment to the closure panel;

a mount bracket configured for attachment to the vehicle body;

a hinge member pivotably coupled to the closure panel bracket and to the mount bracket, the hinge member operably coupled to the drive member; and a link pivotably coupled to the hinge member, the link coupled for movement relative to the mount bracket and for movement relative to the closure panel bracket, wherein the hinge member is moveable from a first position corresponding to the closed position of the closure panel to a second position corresponding to the open position of the closure panel, wherein during a primary stage of movement of the hinge member from the first position toward the second position, the hinge member pivots relative to the closure panel bracket, causing the closure panel to move from the closed position along a first path, and during a secondary stage of movement of the hinge member from the first position toward the second position, after the primary stage of movement, the hinge member and the closure panel bracket move conjointly with one another, causing the closure panel to move along a second path to the open position, the first and second paths being geometrically different.

10. The hinge system of claim 9, wherein the mount bracket has a track along which the link translates as the hinge member moves between the first position and the second position.

11. The hinge system of claim 10, wherein the track has a first section and a second section, the first section corresponding to the primary stage of movement of the hinge member and the second section corresponding to the secondary stage of movement of the hinge member.

12. The hinge system of claim 11, wherein the first section and the second section have different radius of curvatures.

13. The hinge system of claim 12, wherein the second section has a constant radius of curvature.

14. The hinge system of claim 10, wherein the link translates relative to the closure panel bracket during the primary stage of movement of the hinge member.

15. The hinge system of claim 14, wherein the link is substantially fixed relative to the closure panel bracket during the secondary stage of movement of the hinge member.

16. The hinge system of claim 9, wherein the first path traverses a varying radius of movement.

17. The hinge system of claim 16, wherein the second path traverses a substantially constant radius of movement.

18. A hinge system for moving a closure panel relative to a vehicle body of a motor vehicle between open and closed positions, comprising:

a closure panel bracket configured for attachment to the closure panel;

a mount bracket configured for attachment to the vehicle body;

a link pivotably coupled to the mount bracket;

a hinge member coupled to the link and pivotably coupled to the closure panel bracket about a first axis of rotation and to the mount bracket about a second axis of rotation, wherein the hinge member is configured to pivot about both the first axis of rotation and the second axis of rotation to allow the closure panel to move in a substantially straight cross-vehicle X-direction to allow the closure panel to move away from the closed position to a partially open position during a primary stage of movement, and is configured to pivot about one of the first axis of rotation and the second axis of rotation to allow the closure panel to substantially rotate solely about the one of the first axis of rotation or the second axis of rotation from the partially open position to the open position during a secondary stage of movement.

* * * * *